(12) United States Patent
Patel et al.

(10) Patent No.: US 10,837,640 B2
(45) Date of Patent: Nov. 17, 2020

(54) COMBUSTION SECTION OF A GAS TURBINE ENGINE

(71) Applicant: General Electric Company, Schenectady, NY (US)

(72) Inventors: Nayan Vinodbhai Patel, Liberty Township, OH (US); Chad Holden Sutton, Nashville, TN (US); Duane Douglas Thomsen, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 570 days.

(21) Appl. No.: 15/450,308

(22) Filed: Mar. 6, 2017

(65) Prior Publication Data
US 2018/0356095 A1 Dec. 13, 2018

(51) Int. Cl.
*F23R 3/28* (2006.01)
*F23R 3/10* (2006.01)
*F23R 3/00* (2006.01)
*F23R 3/14* (2006.01)

(52) U.S. Cl.
CPC .............. *F23R 3/283* (2013.01); *F23R 3/002* (2013.01); *F23R 3/10* (2013.01); *F05D 2230/642* (2013.01); *F05D 2240/15* (2013.01); *F23R 3/14* (2013.01); *F23R 3/286* (2013.01)

(58) Field of Classification Search
CPC ............................. F23R 3/283; F05D 2230/90
See application file for complete search history.

(56) References Cited

U.S. PATENT DOCUMENTS

| | | | |
|---|---|---|---|
| 3,604,716 A | 9/1971 | Webert | |
| 4,534,166 A * | 8/1985 | Kelm | F23R 3/26 239/402.5 |
| 5,330,321 A | 7/1994 | Roberts et al. | |

(Continued)

FOREIGN PATENT DOCUMENTS

| | | |
|---|---|---|
| CN | 105673285 A | 6/2016 |
| DE | 102013220482 B3 | 4/2015 |

(Continued)

OTHER PUBLICATIONS

International Search Report and Written Opinion issued in connection with corresponding PCT Application No. PCT/US2018/015349 dated May 10, 2018.

(Continued)

*Primary Examiner* — Ehud Gartenberg
*Assistant Examiner* — Stephanie Cheng
(74) *Attorney, Agent, or Firm* — Dority & Manning, P.A.

(57) ABSTRACT

A combustion section for gas turbine engine includes an inner liner, an outer liner, and a dome attached to the inner liner and to the outer liner. A heat shield is attached to the dome, with the dome, the heat shield, or both define an opening. The combustion section also includes a fuel nozzle extending at least partially into the opening, the fuel nozzle defining a fuel nozzle axis and a radial direction relative to the fuel nozzle axis. The fuel nozzle defines an aft end, the aft end of the fuel nozzle positioned forward of the aft surface of the heat shield along the fuel nozzle axis such that the aft end of the fuel nozzle defines a minimum separation from the aft surface of the heat shield along the fuel nozzle axis of at least about 0.15 inches.

18 Claims, 3 Drawing Sheets

(56) References Cited

U.S. PATENT DOCUMENTS

| | | | |
|---|---|---|---|
| 5,509,270 A | 4/1996 | Pearce et al. | |
| 5,680,767 A | 10/1997 | Lee et al. | |
| 5,941,076 A * | 8/1999 | Sandelis | F23R 3/002 60/752 |
| 6,298,667 B1 | 10/2001 | Glynn et al. | |
| 6,314,739 B1 | 11/2001 | Howell et al. | |
| 6,415,594 B1 * | 7/2002 | Durbin | F23R 3/286 60/748 |
| 6,435,514 B1 | 8/2002 | Aksit et al. | |
| 6,502,400 B1 | 1/2003 | Freidauer et al. | |
| 6,655,148 B2 | 12/2003 | Calvez et al. | |
| 6,679,063 B2 * | 1/2004 | Ebel | F23R 3/10 60/747 |
| 6,725,667 B2 | 4/2004 | Farmer et al. | |
| 6,840,519 B2 | 1/2005 | Dinc et al. | |
| 6,895,757 B2 | 5/2005 | Mitchell et al. | |
| 6,898,938 B2 * | 5/2005 | Mancini | F23D 11/107 60/740 |
| 6,904,757 B2 | 6/2005 | Mitchell et al. | |
| 7,121,095 B2 * | 10/2006 | McMasters | F23R 3/10 60/746 |
| 7,237,389 B2 | 7/2007 | Ryan et al. | |
| 7,260,936 B2 | 8/2007 | Patel et al. | |
| 7,451,600 B2 | 11/2008 | Patel et al. | |
| 7,500,364 B2 | 3/2009 | Schumacher et al. | |
| 7,572,099 B2 | 8/2009 | Addis | |
| 7,845,174 B2 | 12/2010 | Parkman et al. | |
| 7,856,826 B2 | 12/2010 | Brown et al. | |
| 7,878,000 B2 * | 2/2011 | Mancini | F23R 3/14 60/737 |
| 7,905,093 B2 | 3/2011 | Li et al. | |
| 8,141,370 B2 | 3/2012 | Bulman et al. | |
| 8,141,371 B1 | 3/2012 | Habarou et al. | |
| 8,281,597 B2 | 10/2012 | Li et al. | |
| 8,348,180 B2 | 1/2013 | Mao et al. | |
| 8,479,490 B2 | 7/2013 | Zupanc et al. | |
| 8,511,088 B2 * | 8/2013 | Imamura | F23R 3/60 60/748 |
| 8,689,563 B2 * | 4/2014 | Low | F23R 3/14 60/737 |
| 8,756,935 B2 | 6/2014 | Duval et al. | |
| 8,834,056 B2 | 9/2014 | Keith et al. | |
| 10,012,387 B2 | 7/2018 | Patel et al. | |
| 2005/0262843 A1 | 12/2005 | Monty | |
| 2010/0028698 A1 * | 2/2010 | Schlichting | C04B 35/488 428/469 |
| 2011/0219775 A1 | 9/2011 | Jarmon et al. | |
| 2011/0271684 A1 | 11/2011 | Corsmeier et al. | |
| 2012/0151928 A1 | 6/2012 | Patel et al. | |
| 2012/0151930 A1 | 6/2012 | Patel et al. | |
| 2012/0272652 A1 | 11/2012 | Nicholls et al. | |
| 2013/0074501 A1 | 3/2013 | Tiwary et al. | |
| 2013/0174562 A1 | 7/2013 | Holcomb et al. | |
| 2014/0096527 A1 | 4/2014 | Bangerter et al. | |
| 2014/0216044 A1 | 8/2014 | Erbas-Sen et al. | |
| 2015/0016971 A1 | 1/2015 | Freeman | |
| 2015/0033746 A1 * | 2/2015 | Carey | F02C 7/24 60/752 |
| 2015/0121897 A1 | 5/2015 | Ress, Jr. | |
| 2015/0322807 A1 | 11/2015 | Budnick | |
| 2015/0377488 A1 | 12/2015 | Elkady et al. | |
| 2016/0215981 A1 | 7/2016 | Dery | |
| 2017/0009986 A1 | 1/2017 | Patel et al. | |
| 2018/0010797 A1 * | 1/2018 | Marusko | F23R 3/002 |

FOREIGN PATENT DOCUMENTS

| | | |
|---|---|---|
| FR | 3004518 A1 | 10/2014 |
| WO | 2014/078694 A1 | 5/2014 |

OTHER PUBLICATIONS

U.S. Appl. No. 14/842,867, filed Sep. 2, 2015.
Combined Chinese Office Action and Search Report Corresponding to Application No. 20180030103 dated Apr. 26, 2020.

\* cited by examiner

COMBUSTION SECTION OF A GAS TURBINE ENGINE

FIELD

The present subject matter relates generally to a gas turbine engine, or more particularly to a combustion section of a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The combustion section of the gas turbine engine must withstand extremely high operating temperatures. Due to these high temperatures, a heat shield (e.g., a deflector plate) may be placed around a dome of a combustor assembly. The combustor assembly additionally includes a fuel nozzle at a forward end for injecting a fuel-air mixture into a combustion chamber to generate the combustion gases. However, as a byproduct of such combustion, the combustion gases contain certain undesirable emissions, such as NOx and CO, and further the process of combustion may create combustor dynamics within the combustion chamber. It is desirable to minimize the amount of undesirable emissions created and combustor dynamics generated during the combustion process. Accordingly, a combustion section capable of reducing one or both of the undesirable emissions created and combustor dynamics generated during the combustion process would be useful.

BRIEF DESCRIPTION

Aspects and advantages of the invention will be set forth in part in the following description, or may be obvious from the description, or may be learned through practice of the invention.

In one exemplary embodiment of the present disclosure, a combustion section of the gas turbine engine is provided. The combustion section includes an inner liner and an outer liner together defining in part a combustion chamber. The combustion section also includes a dome attached to the inner liner and to the outer liner. The combustion system also includes a heat shield attached to the dome and having an aft surface. The dome, the heat shield, or both define an opening. The combustion section also includes a fuel nozzle extending at least partially into the opening, the fuel nozzle defining a fuel nozzle axis and a radial direction relative to the fuel nozzle axis. The fuel nozzle defines an aft end, the aft end of the fuel nozzle positioned forward of the aft surface of the heat shield along the fuel nozzle axis such that the aft end of the fuel nozzle defines a minimum separation from the aft surface of the heat shield along the fuel nozzle axis of at least about 0.15 inches.

In certain exemplary embodiments the aft end of the fuel nozzle defines a minimum separation from the aft surface of the heat shield along the fuel nozzle axis of at least about 0.20 inches.

In certain exemplary embodiments the aft surface of the heat shield defines a reference line that intersects the fuel nozzle axis, wherein the reference line defines an angle with the fuel nozzle axis between about seventy-five degrees and about one hundred and five degrees. For example, in certain exemplary embodiments the reference line defines an angle with the fuel nozzle axis of about ninety degrees.

In certain exemplary embodiments the heat shield further comprises an inner surface extending substantially parallel to the fuel nozzle axis, wherein the inner surface of the heat shield defines the opening. For example, in certain exemplary embodiments the heat shield further comprises a transition surface extending from the inner surface to the aft surface, wherein the transition surface defines a reference line that intersects the fuel nozzle axis, wherein the reference line defines an angle with the fuel nozzle axis between about fifteen degrees and about sixty degrees. Additionally, or alternatively, in certain embodiments the heat shield defines a first bend at an aft end of the inner surface of the heat shield, wherein the aft end of the fuel nozzle is either aligned with or positioned forward of the first bend of the heat shield along the fuel nozzle axis.

In certain exemplary embodiments the combustion section also includes a mixer positioned at least partially within the opening, wherein the fuel nozzle extends at least partially through the mixer, wherein the mixer defines an aft end, and wherein the aft end of the mixer is positioned forward of the aft end of the fuel nozzle along the fuel nozzle axis. For example, in certain exemplary embodiments the heat shield further comprises an inner surface extending substantially parallel to the fuel nozzle axis and a transition surface extending from the inner surface to the aft surface, wherein the transition surface defines a reference line, and wherein the reference line of the transition surface intersects with the aft end of the mixer.

In certain exemplary embodiments the outer liner defines an igniter opening for receiving an igniter, wherein the combustion section defines a reference line from a center of the igniter opening to a point on the fuel nozzle axis at the aft end of the fuel nozzle, and wherein the reference line defines an angle between about forty degrees and about fifty degrees with the fuel nozzle axis.

In certain exemplary embodiments the combustion section also includes an outer combustor casing; a diffuser positioned upstream of the combustion chamber; a first structural member extending between the outer combustor casing and the diffuser; and a second structural member extending from the diffuser generally towards the inner liner, wherein the first structural member, the second structural member, or both includes a thermal control feature. For example, in certain exemplary embodiments the second structural member includes the thermal control feature, wherein the thermal control feature is at least one of a heat shield or a thermal barrier coating.

In another exemplary embodiment of the present disclosure, a combustion section of the gas turbine engine is provided. The combustion section includes an inner liner and an outer liner together defining in part a combustion chamber. The combustion section also includes a dome attached to the inner liner and to the outer liner, and a heat shield attached to the dome and including an aft surface. The dome, the heat shield, or both defines an opening. The combustion section also includes a fuel nozzle extending at least partially into the opening. The fuel nozzle defines a fuel nozzle axis and a radial direction relative to the fuel nozzle axis. The fuel nozzle defines an aft end, the aft end of the fuel nozzle positioned forward of the aft surface of the heat shield along the fuel nozzle axis. The aft surface of the heat shield defines a reference line that intersects the fuel nozzle axis, the reference line defining an angle with the fuel nozzle axis between about seventy-five degrees and about one hundred and five degrees.

In certain exemplary embodiments the aft end of the fuel nozzle defines a minimum separation from the aft surface of the heat shield along the fuel nozzle axis of at least about 0.15 inches.

In certain exemplary embodiments the aft end of the fuel nozzle defines a minimum separation from the aft surface of the heat shield along the fuel nozzle axis of at least about 0.20 inches.

In certain exemplary embodiments the reference line defines an angle with the fuel nozzle axis of about ninety degrees.

In certain exemplary embodiments the heat shield further comprises an inner surface extending substantially parallel to the fuel nozzle axis, wherein the inner surface of the heat shield defines the opening. For example, in certain exemplary embodiments the heat shield further includes a transition surface extending from the inner surface to the aft surface, wherein the transition surface defines a reference line that intersects the fuel nozzle axis, wherein the reference line defines an angle with the fuel nozzle axis between about fifteen degrees and about sixty degrees. Additionally, or alternatively, in certain exemplary embodiments the heat shield defines a first bend at an aft end of the inner surface of the heat shield, wherein the aft end of the fuel nozzle is either aligned with or positioned forward of the first bend of the heat shield along the fuel nozzle axis.

In certain exemplary embodiments the outer liner defines an igniter opening for receiving an igniter, wherein the combustion section defines a reference line from a center of the igniter opening to a point on the fuel nozzle axis at the aft end of the fuel nozzle, and wherein the reference line defines an angle between about forty degrees and about fifty degrees with the fuel nozzle axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10% margin. Here and throughout the specification and claims, range limitations are combined and interchanged, such ranges are identified and include all the sub-ranges contained therein unless context or language indicates otherwise.

Figure 1:
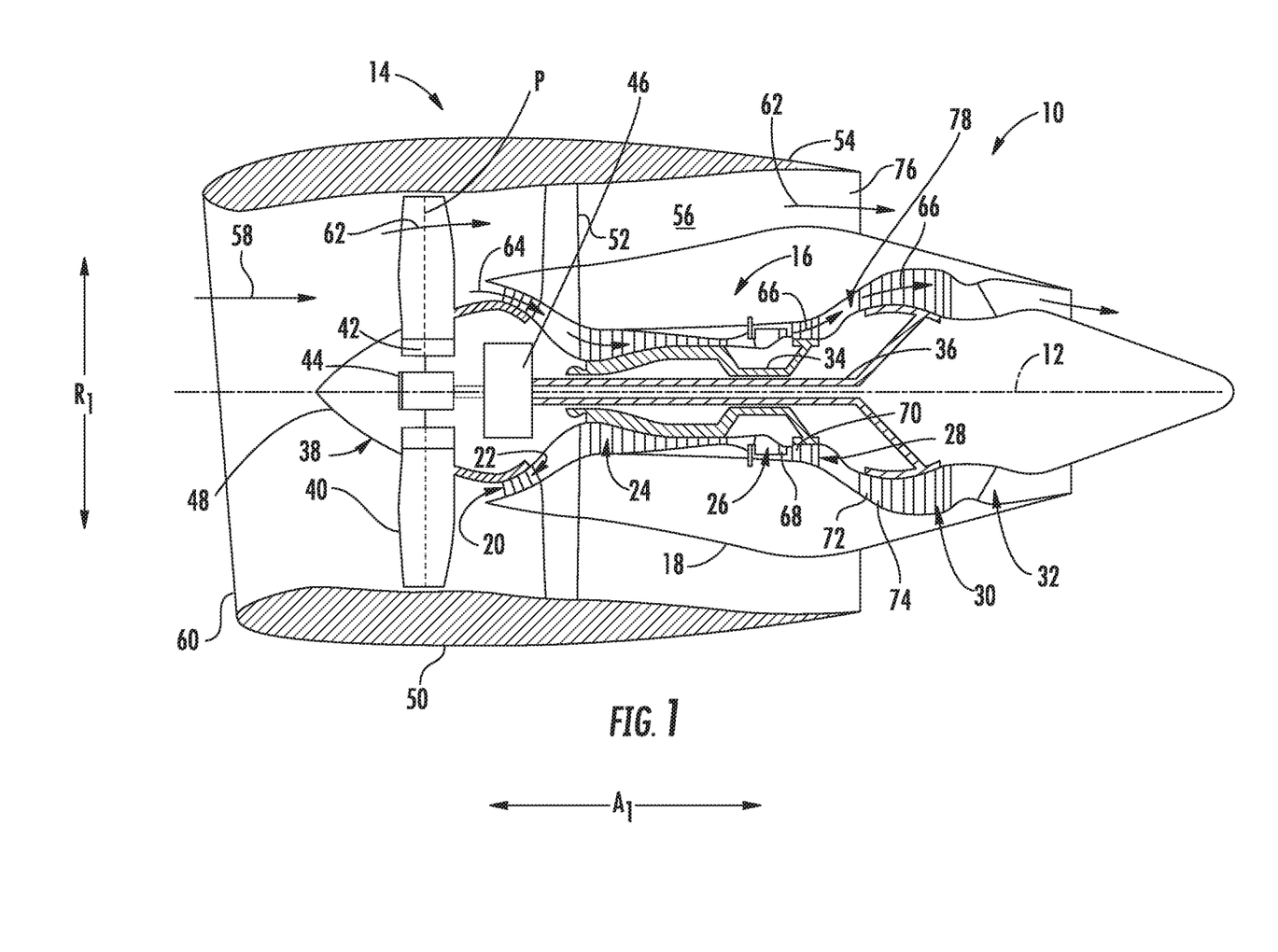
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A1 (extending parallel to a longitudinal centerline 12 provided for reference) and a radial direction R1. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R1. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is, for the embodiment depicted, supported relative to the core turbine engine 16 by a plurality of circumferentially-spaced outlet guide vanes 52. Additionally, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive, turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc.

Figure 2:
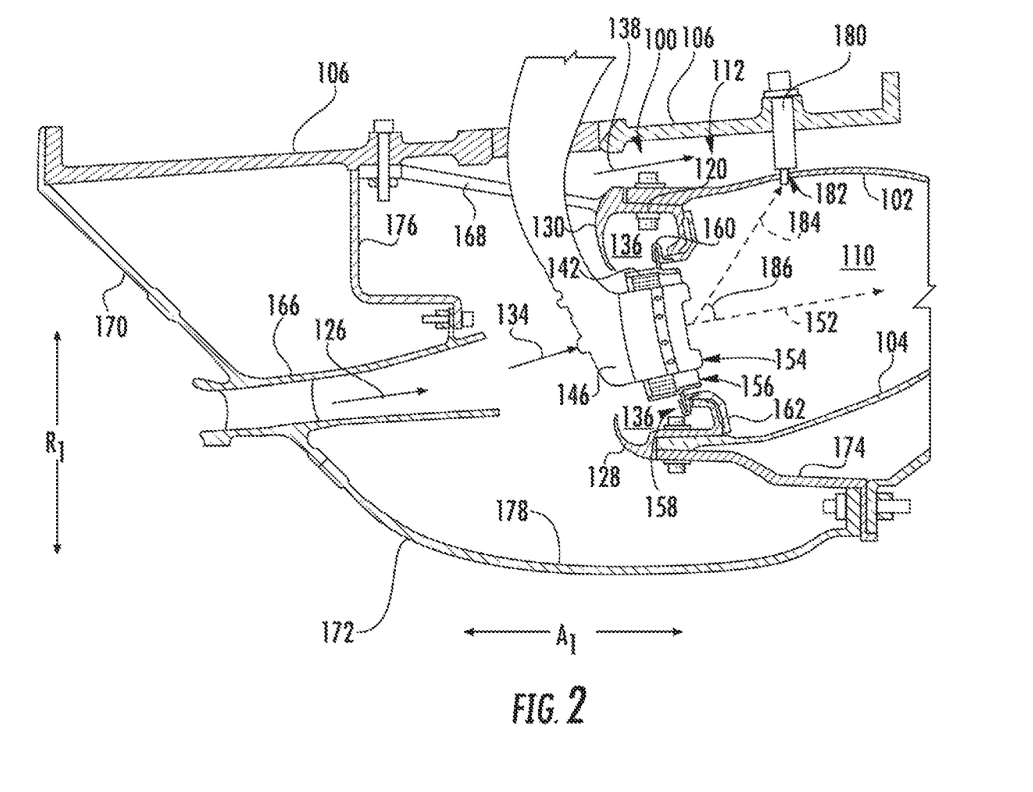
FIG. 2 is a schematic, cross-sectional view of one embodiment of a combustion section suitable for use within the gas turbine engine shown in FIG. 1.

Referring now to FIG. 2, a schematic cross-sectional view of one embodiment of a combustion section 26 including a combustor assembly 100 in accordance with an exemplary aspect of the present subject matter is provided. In the exemplary embodiment depicted, the combustion section 26 is configured to include a single annular combustor. However, it will be appreciated that in other exemplary embodiments, the combustion section 26 may instead be configured to include any other combustor, including, but not limited to, a double annular combustor or a canannular combustor.

As shown in FIG. 2, the combustor assembly 100 includes an outer liner 102 and an inner liner 104 disposed radially inward of an outer combustor casing 106. Outer and inner liners 102 and 104 are spaced radially from each other, and together define in part a combustion chamber 110 therebetween. Outer liner 102 and outer casing 106 form an outer passage 112 therebetween.

The combustor assembly 100 additionally includes a dome 120 mounted upstream of the combustion chamber 110 and attached to forward ends of the outer and inner liners 102, 104. More particularly, for the embodiment depicted, the dome 120 is an annular dome formed of an inner annular dome section 122 attached to the forward end of the inner liner 104 and an outer annular dome section 124 attached to the forward end of the outer liner 102 (see FIG. 3).

For the embodiments depicted, the inner liner 104, the outer liner 102, and the other combustor components subjected to high temperatures may be formed of a ceramic matrix composite (CMC) material, which is a non-metallic material having high temperature capability and low ductility. Exemplary CMC materials utilized for such liners 102 and 104 may include silicon carbide, silicon, silica or alumina matrix materials and combinations thereof. Ceramic fibers may be embedded within the matrix, such as oxidation stable reinforcing fibers. By contrast, the dome 120 may be formed of a metal, such as a nickel-based superalloy or cobalt-based superalloy. Additionally, or alternatively, these components may be treated with a thermal barrier coating (TBC).

As shown in FIG. 2, the combustor assembly 100 may be configured to receive an annular stream of pressurized compressor discharge air 126 from a discharge outlet of the high pressure compressor 24. To assist in directing the compressed air, for the embodiment depicted, the dome 120 includes an inner cowl 128 and an outer cowl 130. Compressed fluid may enter combustor assembly 100 between the inner cowl 128 and the outer cowl 130 in a direction generally indicated by arrow 134. The compressed air may enter into a first cavity 136 defined at least in part by the inner and outer cowls 128, 130 of the annular dome 120. As will be discussed in more detail below, a portion of the compressed air in the first cavity 136 may be used for combustion, while another portion may be used for cooling various sections of the combustor assembly 100.

In addition to directing air into first cavity 136 and the combustion chamber 110, the inner and outer cowls 128, 130 may direct a portion of the compressed air around the outside of the combustion chamber 110 to facilitate cooling liners 102 and 104. For example, as shown in FIG. 2, a portion of the compressor discharge air 126 may flow around the combustion chamber 110, as indicated by arrow 138, to provide cooling air to outer passage 112.

In certain exemplary embodiments, the inner dome section 122 (including the inner cowl 128) may be formed integrally as a single annular component, and similarly, the outer dome section 124 (including the outer cowl 130) may also be formed integrally as a single annular component. It should be appreciated, however, that in other exemplary embodiments, the inner dome section 122 and/or the outer dome section 124 may alternatively be formed of one or more components joined in any suitable manner. Additionally, or alternatively, still, the inner dome section 122 and outer dome section 124 may be formed integrally together. For example, the inner dome section 122 and outer dome section 124 may be formed integrally as a single annular component, or alternatively, as a plurality of separate circumferential components. Moreover, although the outer cowl 130 and inner cowl 128 are discussed as being formed integrally with the remaining portions of the outer dome section 124 and inner dome section 122, respectively, in certain exemplary embodiments, one or more of these components may be formed separately.

Referring still to FIG. 2, the combustor assembly 100 further includes a plurality of mixers, or rather, mixer assemblies 142, spaced along a circumferential direction of the gas turbine engine (i.e., a direction extending about an axial direction A1 of the gas turbine engine; see FIG. 1) between the outer annular dome section 124 and the inner dome section 122. Additionally, the combustor assembly 100 includes a plurality of fuel nozzles 146, each of the plurality of fuel nozzles 146 positioned within a respective mixer assembly 142. As may be seen in FIG. 2, depicting a single fuel nozzle 146 of the plurality of fuel nozzles 146, each fuel nozzle 146 defines a fuel nozzle axis 152 and a radial direction R2 to relative to the fuel nozzle axis 152. Further, each fuel nozzle 146 defines an aft end 154, and similarly, each mixer assembly 142 defines an aft end 156. The aft end 154 of the fuel nozzle 146 is an aft-most portion of the fuel nozzle 146 along the fuel nozzle axis 152, and similarly, the aft end 156 of the mixer assembly 142 is an aft-most portion of the mixer assembly 142 along the fuel nozzle axis 152.

Notably, for the exemplary combustor assembly 100 depicted, retainers 158 are provided for mounting the mixer assemblies 142 within the combustor assembly 100. More specifically, each of the retainers 158 includes one or more attachment members 160 for mounting the mixer assembly 142 within the combustor assembly 100. For the embodiment depicted, the attachment members 160 are each configured as clips for receiving a portion of the respective mixer assembly 142. However, in other exemplary embodiments, the attachment members 160 may be configured in any other suitable manner.

Moreover, as is also shown, the combustor assembly 100 further includes a heat shield 162 (sometimes also referred to as a heat deflector) attached to the dome 120 for thermally insulating the dome 120 from the relatively high temperatures generated within the combustion chamber 110 during operation of the gas turbine engine. The heat shield 162 may be formed of, e.g., a CMC material or other material capable of withstanding the relatively high temperatures within the combustion chamber 110. In certain exemplary embodiments, the heat shield 162 may be configured as a continuous, annular component. Alternatively, however, in other exemplary embodiments, the heat shield 162 may include a plurality of separately formed components arranged along a circumferential direction of the gas turbine engine.

At least one of the heat shield 162 or dome 120 defines a plurality of openings 164 within which the mixer assemblies 142 and fuel nozzles 146 extend when the combustor assembly 100 is assembled. More particularly, for the embodiment depicted, the heat shield 162 defines the plurality of openings 164 spaced along a circumferential direction of the gas turbine engine, with each of the mixer assemblies 142 and fuel nozzles 146 configured to extend into and/or be positioned at least partially within a respective opening 164 of the heat shield 162.

Fuel is transported to the combustor assembly 100 by a fuel distribution system (not shown), where it is introduced through the plurality of fuel nozzles 146. The fuel nozzles 146 may inject fuel in any suitable manner, and in any suitable direction. For example, the fuel nozzle 146 may inject fuel outwardly along the radial direction R2 of the fuel nozzle 146, where the fuel may be swirled with the incoming compressed air. For example, fuel and pressurized air may be swirled and mixed together by mixer assemblies 142, and the resulting fuel/air mixture may then be discharged into combustion chamber 110 for combustion thereof. Additionally, the fuel nozzles 146 may inject fuel downstream generally along the fuel nozzle axis 152.

Accordingly, it should be appreciated that compressed air may be directed from the compressor section into or through one or more of the mixer assemblies 142 to support combustion in the upstream end of the combustion chamber 110. For the embodiment depicted, the combustion section 26 further includes a diffuser 166 positioned upstream of the combustion chamber 110 for receiving compressed air from the compressor section, and providing such compressed air to the combustor assembly 100.

Furthermore, the combustor assembly 100 is mounted in such a manner to ensure the fuel nozzles 146 and mixer assemblies 142 maintain desired clearances with the heat shields 162 and other components during operation of the gas turbine engine. For the particular embodiment depicted, a forward end of the combustor assembly 100 is generally mounted within the combustion section 26 at an outer side along the radial direction R1 and at an inner side along the radial direction R1.

Referring first to the mounting of the combustor assembly 100 at the radially outer side, the combustion section 26 includes an outer frame member 168 extending from the outer dome section 124 to the outer combustor casing 106. Specifically, for the embodiment depicted, the outer frame member 168 extends from the outer cowl 130 of the outer dome section 124 to the outer combustor casing 106 at a location forward of the combustor assembly 100. In certain exemplary embodiments, the outer frame member 168 may be configured as an "A-frame" member, or alternatively, in any other suitable manner. Moreover, for the embodiment depicted, the outer frame member 168 is formed integrally with the outer dome section 124, or rather, the outer cowl 130 of the outer dome section 124. However, in other embodiments, the outer frame member 168 may instead be a separate component attached to the outer dome section 124, or any other suitable component of the combustor assembly 100, in any other suitable manner.

Referring now to the mounting of the combustor assembly 100 at the radially inner side, the load path generally extends across the diffuser 166. More specifically, the combustion section 26 further includes a first structural member 170 extending between the outer combustor casing 106 and the diffuser 166 and a second structural member 172 extending from the diffuser 166 generally towards the inner liner 104 of the combustor assembly 100. For the embodiment depicted the second structural member 172 extends from the diffuser 166 to an inner frame member 174 at a location inward of the combustor assembly 100 along the radial direction R1 and aft of the forward end of the combustor assembly 100 (including, e.g., the dome 120, the heat shield 162, the fuel nozzle 146, and the mixer assembly 142). The inner frame member 174, in turn, extends to the forward end of the combustor assembly 100, where it connects to the inner liner 104 (at a forward end of the inner liner 104) and the dome 120.

Moreover, the combustion section 26 includes an intermediate frame member 176 mounting the diffuser 166 to the outer combustor casing 106. For the embodiment depicted, the intermediate frame member 176 extends from an aft end of the diffuser 166 to the outer combustor casing 106.

As stated, the above mounting features for the combustor assembly 100 may be configured to maintain certain clearances of, e.g., the fuel nozzles 146 and mixer assemblies 142 of the combustor assembly 100 during operation of the gas turbine engine. For example, it will be appreciated that certain of the components for mounting the combustor assembly 100 may be exposed to greater temperature swings during operation of the gas turbine engine, or otherwise may be more susceptible to thermal growth during operation of the gas turbine engine. For example, the first structural member 170 and the second structural member 172 may be more susceptible to thermal growth than the outer combustor casing 106, given that an outer surface of the outer combustor casing 106 is exposed to relatively cool air during operation. Additionally, thermal growth of the first and second structural members 170, 172 relative to the outer combustor casing 106 may cause the inner and outer liners 104, 102, the dome 120, and the heat shield 162 to "pivot" relative to the fuel nozzles 146. Accordingly, in order to reduce this relative movement, the combustion section 26 of the present disclosure includes one or more features for controlling the thermal growth of one or more of the components mounting the combustor assembly 100.

More specifically, for the embodiment depicted, the first structural member 170, the second structural member 172, or both includes a thermal control feature. More specifically, for the embodiment depicted the second structural member 172 includes a thermal control feature, with the thermal control feature being at least one of a heat shield or a thermal barrier coating. More specifically, still, for the embodiment depicted, the thermal control feature of the second structural member 172 is a thermal barrier coating 178 configured for limiting an amount of thermal growth of the second structural member 172 during operation of the gas turbine engine. The thermal barrier coating 178 may be any suitable thermal barrier coating known to reduce an amount of heat transfer to an underlying component. In such a manner, the clearances of the fuel nozzles 146, mixer assemblies 142, or both within the combustor assembly 100 may be maintained during operation of the gas turbine engine.

It should be appreciated, however, that in other exemplary embodiments, one or more of the various other components described herein for mounting the combustor assembly 100 may additionally include one or more thermal control features. For example, in certain exemplary embodiments, the first structural member 170 may include one or more thermal control features. For example, in certain exemplary embodiments, the first structural member 170 may include, or rather, define, a plurality of openings or cooling holes for controlling a temperature of the first structural member 170. Similarly, in certain exemplary embodiments, the outer combustor casing 106, the outer frame member 168, the inner frame member 174, and/or the intermediate frame member 176 may include one or more thermal control features. Notably, low the various thermal control features described herein may generally be utilized for reducing a temperature of a component, in other exemplary embodiments, thermal control features may be included for increasing a temperature of a component.

Referring still to FIG. 2, the combustor assembly 100 further includes an ignition assembly suitable for igniting the fuel-air mixture within the combustion chamber 110. Upon ignition, the resulting combustion gases may flow through the combustion chamber 110 into and through the turbine section of the gas turbine engine. For the embodiment depicted, the ignition assembly includes one or more igniters 180 extending through the outer combustor casing 106 and to or through the outer liner 102. Accordingly, for the embodiment depicted, the outer liner 102 defines an igniter opening 182 for receiving one of the igniters 180. For the embodiment depicted, the combustion section 26 defines an igniter reference line 184, depicted in phantom in FIG. 2, extending from a center of the igniter opening 182 of the outer liner 102 to a point on the fuel nozzle axis 152 at the aft end 154 of the fuel nozzle 146. The igniter reference line 184 defines an angle 186 with the fuel nozzle axis 152 between about forty degrees (40°) and about fifty degrees (50°). For example, in certain exemplary embodiments, the angle 186 between the igniter reference line 184 and the fuel nozzle axis 152 may be about forty-five degrees (45°).

Figure 3:
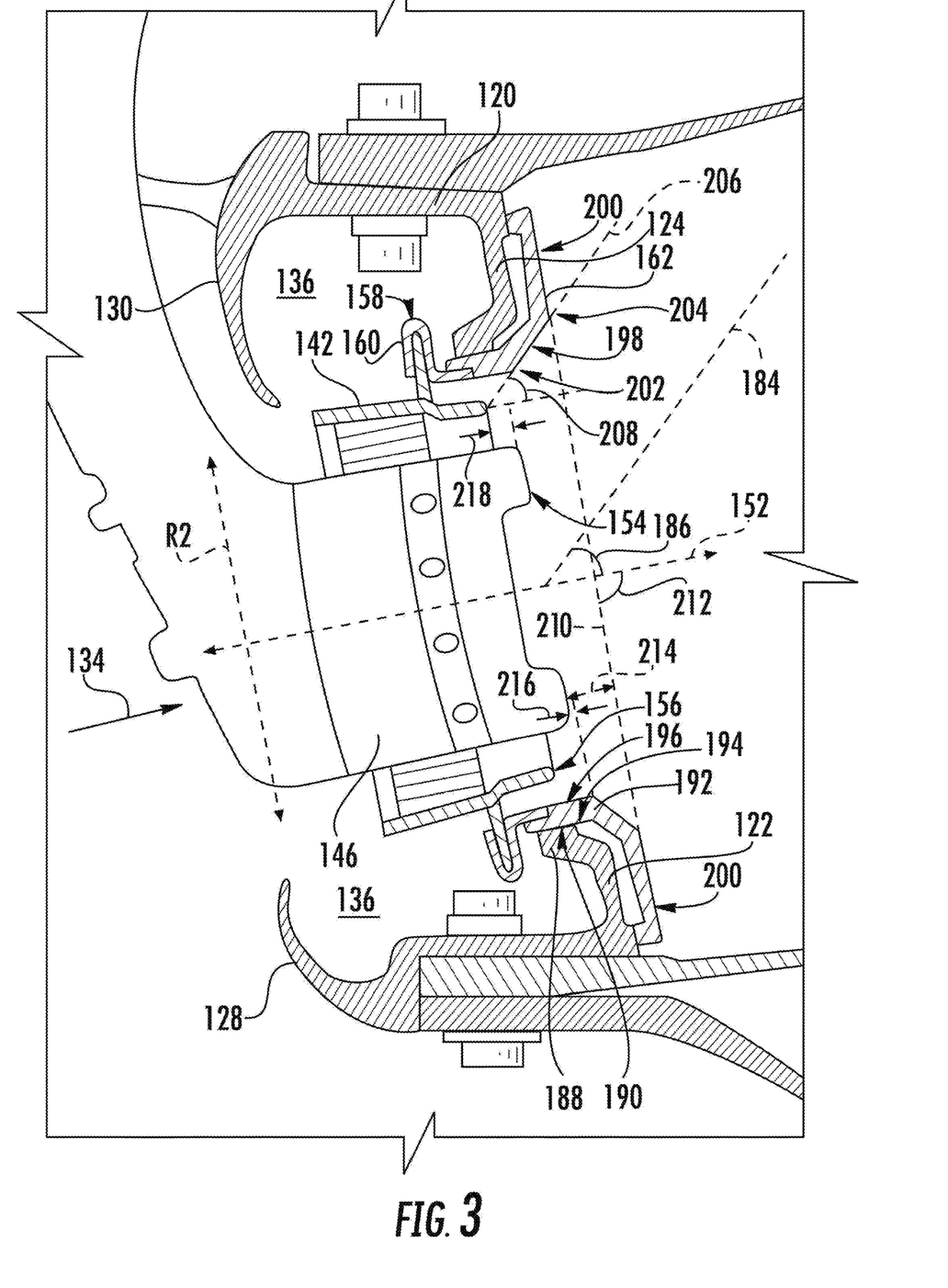
FIG. 3 is a close-up, cross-sectional view of a combustor assembly of the exemplary combustion section depicted in FIG. 2.

Referring now also to FIG. 3, a close-up, cross-sectional view of a forward end of the combustor assembly 100 described above with reference to FIG. 2 is provided. As is depicted, and as briefly mentioned earlier, each fuel nozzle 146 defines a fuel nozzle axis 152 and a radial direction R2 relative to the fuel nozzle axis 152. Moreover, as briefly mentioned above, for the embodiment depicted, the heat shield 162 defines a plurality of openings 164 within which the mixer assemblies 142 and fuel nozzles 146 extend. Referring particularly to the opening 164 defined by the heat shield 162 depicted in FIG. 2, the opening 164 defined by the heat shield 162 is a substantially cylindrical opening extending generally along the fuel nozzle axis 152 of the fuel nozzle 146.

As is also depicted, the dome 120 includes a perimeter flange 188 extending around the opening 164 defined by the heat shield 162. The perimeter flange 188 of the dome 120 defines an inner surface 190 along the radial direction R2 of the fuel nozzle 146 (i.e., a surface closest to the opening 164 defined by the heat shield 162). Additionally, the heat shield 162 includes a perimeter flange 192 extending around the opening 164, the perimeter flange 192 defining an outer surface 194 along the radial direction R2 and an inner surface 196 along the radial direction R2. For the embodiment depicted, the perimeter flange 192 of the heat shield 162 is attached to the perimeter flange 188 of the dome 120. More specifically, the inner surface 190 of the perimeter flange 188 of the dome 120 is coupled to the outer surface 194 of the perimeter flange 192 of the heat shield 162, e.g., by brazing, welding, or some other suitable attachment means. Notably, however, in other exemplary embodiments, the dome 120 and heat shield 162 may be coupled in any other suitable manner. Additionally, or alternatively, in other exemplary embodiments, one or both of the dome 120 and heat shield 162 may not include a perimeter flange and instead may be configured in any other suitable manner.

As is depicted, for the embodiment of FIG. 3, the heat shield 162 generally includes three sections, with each including a substantially straight surface together forming a hot side surface of the heat shield 162. As used herein, a "substantially straight" surface refers to a surface constructed to be straight, limited by reasonable construction methods available, in a plane defined by the radial direction R2 in the fuel nozzle axis 152. More particularly, for the embodiment depicted, the heat shield 162 includes the inner surface 196, as well as a transition surface 198 and an aft surface 200. The transition surface 198 of the heat shield 162 extends from the inner surface 196 of the heat shield 162 to the aft surface 200 of the heat shield 162. Additionally, the aft surface 200 of the heat shield 162 extends from the transition surface 198 of the heat shield 162 generally outwardly along the radial direction R2 of the fuel nozzle 146. The heat shield 162 defines a first bend 202 at an aft end of the inner surface 196 and a forward/radially inward end of the transition surface 198 (i.e., inward along the radial direction R2), as well as a second bend 204 at the aft/radially outward end of the transition surface 198 (i.e., outward along the radial direction R2) and radially inward end of the aft surface 200 along the radial direction R2.

As is also depicted, the inner surface 196 of the heat shield 162 extends substantially parallel to the fuel nozzle axis 152 and defines the opening 164, which as previously stated, is for the embodiment depicted a substantially cylindrical opening. Additionally, the transition surface 198 extends along and defines a transition surface reference line 206 that intersects the fuel nozzle axis 152 of the fuel nozzle 146. The transition surface reference line 206 defines an angle 208 with the fuel nozzle axis 152 between about fifteen degrees (15°) and about sixty degrees (60°). More specifically, for the embodiment depicted, the angle 208 defined by the transition surface reference line 206 with the fuel nozzle axis 152 (depicted at line 152' for clarity) is about forty-five degrees (45°). Furthermore, for the embodiment depicted, the aft surface 200 of the heat shield 162 extends along and defines an aft surface reference line 210 that intersects the fuel nozzle axis 152 of the fuel nozzle 146. The aft surface reference line 210 defines an angle 212 with the fuel nozzle axis 152 between about seventy-five degrees (75°) and about one hundred and five degrees (105°). More specifically, for the embodiment depicted, angle 212 defined by the aft surface reference line 210 with the fuel nozzle axis 152 is about ninety degrees (90°).

It should be appreciated, that as used herein, the term "reference line", as may be defined by a surface of a component, refers to a line representative of a direction in which the surface extends. For example, the reference line may average out any slight bends or curves in the surface to result in a straight line representative of the general direction in which the surface extends.

As noted above, the fuel nozzle 146 and mixer assembly 142 are placed at a specific position within the combustor assembly 100 relative to the dome 120 and the heat shield 162. The inventors of the present disclosure have discovered that such a configuration may reduce, e.g., combustor dynamics and/or omissions during operation of the gas turbine engine.

Specifically, for the embodiment depicted, the aft end 154 of the fuel nozzle 146 is positioned forward of the aft surface 200 of the heat shield 162 along the fuel nozzle axis 152, such that the aft end 154 of the fuel nozzle 146 defines a first minimum separation 214 from the aft surface 200 of the heat shield 162 along the fuel nozzle axis 152 of at least about 0.15 inches. More particularly, for the embodiment depicted, the first minimum separation 214 of the aft end 154 of the fuel nozzle 146 from the aft surface 200 of the heat shield 162 along the fuel nozzle axis 152 is at least about 0.20 inches, such as at least about 0.27 inches, and up to about three inches.

In addition, for the embodiment depicted, the aft end 154 of the fuel nozzle 146 is either aligned with or positioned forward of the first bend 202 of the heat shield 162 along the fuel nozzle axis 152. Specifically, for the embodiment depicted, the aft end 154 of the fuel nozzle 146 is positioned forward of the first bend 202 of the heat shield 162 along the fuel nozzle axis 152, such that the aft end 154 of the fuel nozzle 146 defines a second minimum separation 216 with the first bend 202 of the heat shield 162 along the fuel nozzle axis 152 of at least about 0.05 inches. For example, the second minimum separation 216 of the aft end 154 of the fuel nozzle 146 from the first bend 202 of the heat shield 162 along the fuel nozzle axis 152 may be at least about 0.07 inches, such as at least about 0.1 inches, and up to about two inches.

Furthermore, for the embodiment depicted, the aft end 156 of the mixer assembly 142 is either aligned with or positioned forward of the aft end 154 of the fuel nozzle 146 along the fuel nozzle axis 152. More specifically, for the embodiment depicted the aft end 156 of the mixer assembly 142 is positioned forward of the aft end 154 of the fuel nozzle 146 along the fuel nozzle axis 152, such that the aft end 156 of the mixer assembly 142 defines a third minimum separation 218 with the aft end 154 of the fuel nozzle 146 along the fuel nozzle axis 152 of at least about 0.05 inches. For example, the third minimum separation 218 of the aft end 156 of the mixer assembly 142 from the aft end 154 of the fuel nozzle 146 along the fuel nozzle axis 152 may be at least about 0.1 inches, such as at least about 0.17 inches.

Notably, with such a configuration, the transition surface reference line 206 defined by the transition surface 198 of the heat shield 162 intersects with the aft end 156 of the mixer assembly 142.

It should be appreciated, that each of the relative positions, angles, offsets, etc. described above relate to when the gas turbine engine and combustors assembly are "cold", i.e., when the engine is shutoff and is substantially the same temperature as an ambient temperature. As will be appreciated, once the gas turbine engine is operational, one or more of the components within the combustion section described herein may expand, causing the above-described relative positions, angles, offsets, etc. to change accordingly. Notably, however, the design of the combustor assembly described herein allows for such expansions while maintaining desired clearances, etc.

The inventors of the present disclosure have discovered that including of a combustor assembly including one or more of the fuel nozzle and mixer with the clearances and relative positions described herein may provide for a more efficient and more stable combustor assembly. For example, the inventors of the present disclosure discovered that inclusion of a combustor assembly including one or more of the fuel nozzle and mixer with the clearances and relative positions described herein may result in fewer emissions and less combustor dynamics during operation of the gas turbine engine. Moreover, mounting the exemplary combustor assembly in accordance with the manner described herein may result in the combustor assembly maintaining such clearances during operation of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustion section of a gas turbine engine, the combustion section comprising:
    an inner liner and an outer liner together defining in part a combustion chamber;
    a dome attached to the inner liner and to the outer liner;
    a heat shield attached to the dome and comprising an aft surface, an inner surface, a transition surface defining a transition surface reference line, a first bend disposed between the inner surface and the transition surface, and a second bend disposed between the aft surface and the transition surface, wherein the inner surface defines an opening;
    a mixer positioned at least partially within the opening, the mixer defining an aft end, wherein the transition surface reference line intersects with the aft end of the mixer; and
    a fuel nozzle extending at least partially through the mixer, the fuel nozzle defining:
    a fuel nozzle axis and a radial direction relative to the fuel nozzle axis; and
    an aft end, wherein the aft end of the mixer is positioned forward of the aft end of the fuel nozzle along the fuel nozzle axis, and wherein the aft end of the fuel nozzle is positioned forward of the aft surface of the heat shield along the fuel nozzle axis such that the aft end of the fuel nozzle defines a minimum separation from the aft surface of the heat shield along the fuel nozzle axis of at least 0.15 inches, wherein the inner surface of the heat shield extends substantially parallel to the fuel nozzle axis.

2. The combustion section of claim 1, wherein the aft end of the fuel nozzle defines the minimum separation from the aft surface of the heat shield along the fuel nozzle axis of at least 0.20 inches.

3. The combustion section of claim 1, wherein the aft surface of the heat shield defines an aft surface reference line that intersects the fuel nozzle axis, wherein the aft surface reference line defines an angle with the fuel nozzle axis between seventy-five degrees and one hundred and five degrees.

4. The combustion section of claim 3, wherein the aft surface reference line defines the angle with the fuel nozzle axis of about ninety degrees.

5. The combustion section of claim 1, wherein the transition surface reference line intersects the fuel nozzle axis, wherein the transition surface reference line defines an angle with the fuel nozzle axis between fifteen degrees and sixty degrees.

6. The combustion section of claim 1, wherein the outer liner defines an igniter opening for receiving an igniter, wherein the combustion section defines an igniter reference line from a center of the igniter opening to a point on the fuel nozzle axis at the aft end of the fuel nozzle, and wherein the igniter reference line defines an angle between forty degrees and fifty degrees with the fuel nozzle axis.

7. The combustion section of claim 1, further comprising:
    an outer combustor casing;
    a diffuser positioned upstream of the combustion chamber;
    a first structural member extending between the outer combustor casing and the diffuser; and
    a second structural member extending from the diffuser generally towards the inner liner, wherein the first structural member, the second structural member, or both comprises a thermal control feature.

8. The combustion section of claim 7, wherein the second structural member comprises the thermal control feature, and wherein the thermal control feature is at least one of a thermal control heat shield or a thermal barrier coating.

9. The combustion section of claim 1, wherein the transition surface is substantially straight.

10. The combustion section of claim 1, wherein each of the transition surface, the inner surface, and the aft surface is substantially straight.

11. The combustion section of claim 1, wherein the heat shield abuts the dome at a location radially outward from the second bend relative to the fuel nozzle axis.

12. The combustion section of claim 11, wherein the transition surface is spaced apart from the dome.

13. A combustion section of a gas turbine engine, the combustion section comprising:
    an inner liner and an outer liner together defining in part a combustion chamber;
    a dome attached to the inner liner and to the outer liner;
    a heat shield attached to the dome and comprising an aft surface, an inner surface, a transition surface defining a transition surface reference line, a first bend disposed between the inner surface and the transition surface, and a second bend disposed between the aft surface and the transition surface, wherein the inner surface defines an opening;
    a mixer positioned at least partially within the opening, the mixer defining an aft end, wherein the transition surface reference line intersects with the aft end of the mixer; and
    a fuel nozzle extending at least partially through the mixer, the fuel nozzle defining:
    a fuel nozzle axis and a radial direction relative to the fuel nozzle axis, and
    an aft end, wherein the aft end of the mixer is positioned forward of the aft end of the fuel nozzle along the fuel nozzle axis, and wherein the aft end of the fuel nozzle is positioned at least partially within the opening along the fuel nozzle axis forward of the aft surface of the heat shield, wherein the heat shield defines a radially outermost portion relative to the fuel nozzle axis, and wherein the radially outermost portion of the heat shield abuts the dome.

14. The combustion section of claim 13, wherein the aft end of the fuel nozzle defines a minimum separation from the aft surface at the radially outermost portion of the heat shield along the fuel nozzle axis of at least 0.15 inches.

15. The combustion section of claim 13, wherein the radially outermost portion includes the aft surface of the heat shield, wherein the aft surface defines an aft surface reference line that intersects the fuel nozzle axis, the aft surface reference line defining a first angle with the fuel nozzle axis between seventy-five degrees and one hundred and five degrees.

16. The combustion section of claim 15, wherein the transition surface reference line defines a second angle with the fuel nozzle axis between fifteen degrees and sixty degrees.

17. The combustion section of claim 13, wherein the outer liner defines an igniter opening for receiving an igniter, wherein the combustion section defines an igniter reference line from a center of the igniter opening to a point on the fuel nozzle axis at the aft end of the fuel nozzle, and wherein the igniter reference line defines an angle between forty degrees and fifty degrees with the fuel nozzle axis.

18. The combustion section of claim 13, wherein, relative to the fuel nozzle axis, a radially innermost portion of the heat shield abuts the dome and the transition surface of the heat shield disposed between the radially innermost portion and radially outermost portions is spaced apart from the dome.

\* \* \* \* \*